Feb. 8, 1944.  A. P. NEWALL  2,341,469
METHOD OF MANUFACTURING WAISTED BOLTS
Filed April 6, 1943

Patented Feb. 8, 1944

2,341,469

UNITED STATES PATENT OFFICE 2,341,469

METHOD OF MANUFACTURING WAISTED BOLTS

Archibald Park Newall, Glasgow, Scotland

Application April 6, 1943, Serial No. 481,974
In Great Britain February 20, 1943

1 Claim. (Cl. 10—27)

This invention relates to improvements in the manufacture of so-called "waisted" bolts provided with rolled screw-threads.

The invention consists in an improved method of making a "waisted" bolt according to which the shank of the bolt is subjected to at least one cold extruding operation, is cold swaged so as to provide a "waisted" portion or portions on the shank, is subjected to inter-stage heat treatment, and is cold rolled to form a screw-thread on an unswaged portion of the shank after the heat treatment.

The invention is illustrated, by way of example, in Figs. 1–4 of the accompanying drawing, the figures being elevations showing a bolt in progressive stages of manufacture.

Figure 1:
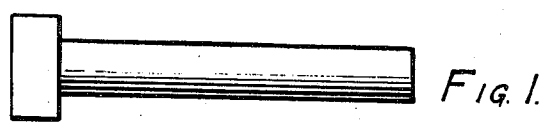
Figure 2:
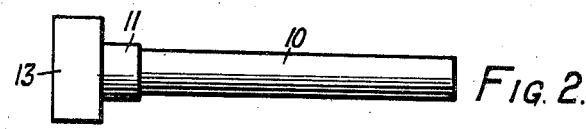
Figure 3:
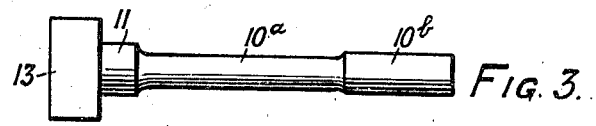
Figure 4:
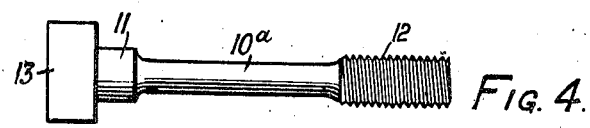

Fig. 1 shows a headed bolt-blank of nominal shank-diameter, which may have been made from bar stock of nominal diameter, or from oversize bar stock extruded down to nominal diameter. Fig. 2 shows the bolt-blank after the greater portion 10 of the shank has been extruded cold down to roll-threading diameter, there having preferably been left adjacent to the head 13 a neck-portion 11 of nominal diameter. Fig. 3 shows the bolt-blank after an intermediate portion 10a of the shank has been circumferentially cold swaged down to "waisted" diameter, i. e., a reduced diameter which is slightly less than the minimum or root diameter of the screw-thread. Fig. 4 shows the bolt after a screw-thread has been cold rolled on the unswaged end portion 10b (Fig. 3) of roll-threading diameter.

Any suitable form of head 13 may be formed on the bolt.

The bolt-blank is inter-stage annealed or otherwise treated as may be found necessary or desirable, before the final thread-rolling operation.

The method of the invention eliminates machine turning operations hitherto usual, is economical of metal, tends to form natural flow lines in the shank, and avoids the possible formation in the shank of tooling scratches which may constitute incipient fractures.

I claim:

The method of manufacturing a "waisted" bolt, consisting in subjecting the shank of the bolt to at least one cold extruding operation, reducing the main portion of the shank to roll-threading diameter and leaving adjacent to the head a neck portion of nominal diameter, cold swaging that part of the shank intermediate said neck portion and the free end portion of the shank to form a "waisted" portion of a diameter less than the root diameter of the screw-thread to be formed, inter-stage heat-treating cold worked parts of the shank, and cold-rolling a screw-thread upon the free end portion of the shank after the final heat treatment.

ARCHIBALD PARK NEWALL.